Oct. 3, 1967  J. P. GENTRY ETAL  3,344,579
MACHINE FOR SETTLING FRUIT
Filed Feb. 6, 1964  4 Sheets-Sheet 2
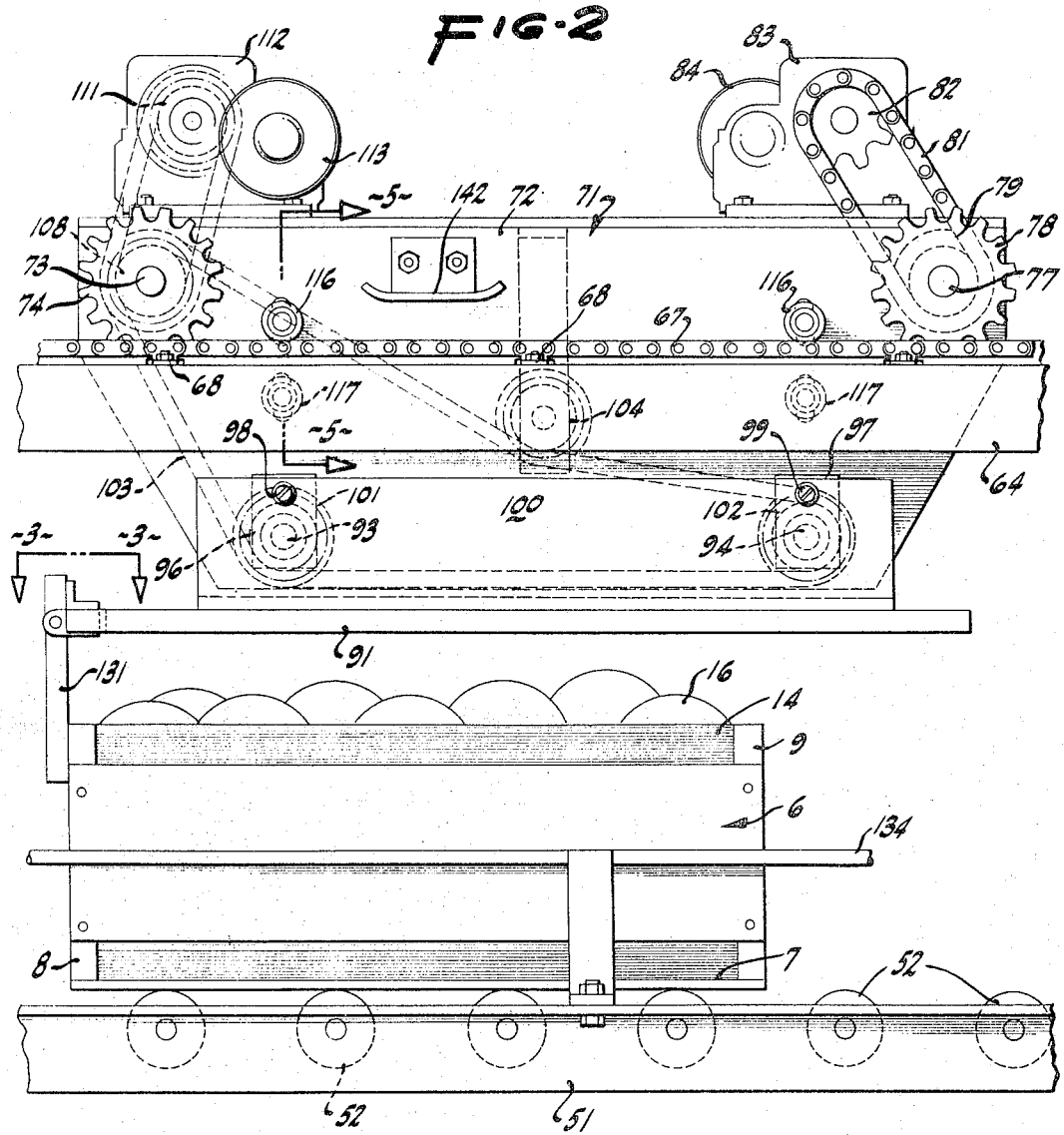
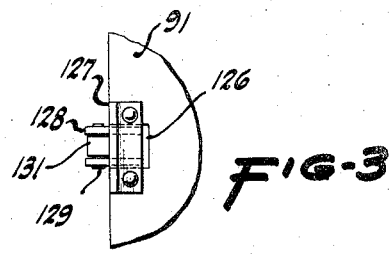
INVENTORS
JOE P. GENTRY
GEORGE R. GIANNINI
BY
Lothrop & West
ATTORNEYS Oct. 3, 1967   J. P. GENTRY ETAL   3,344,579
MACHINE FOR SETTLING FRUIT
Filed Feb. 6, 1964   4 Sheets-Sheet 3
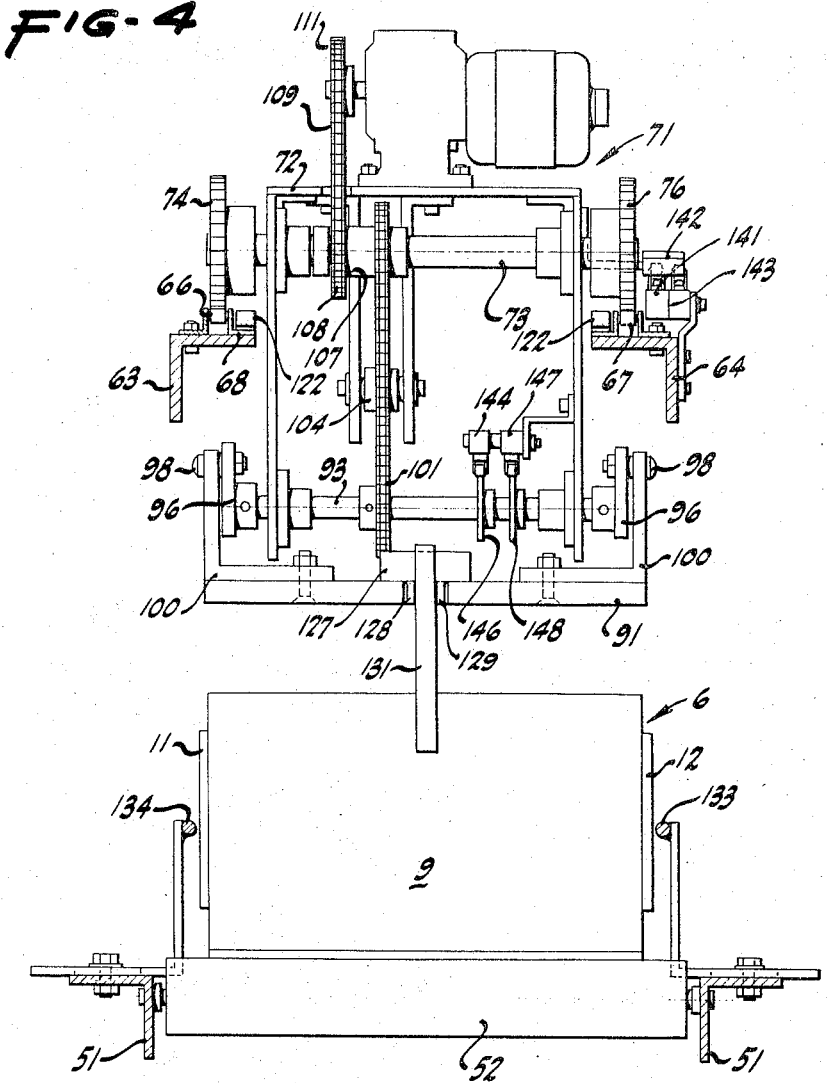
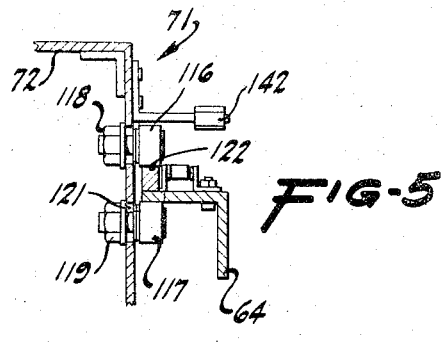
INVENTORS
JOE P. GENTRY
GEORGE R. GIANNINI
BY
Lothrop & West
ATTORNEYS

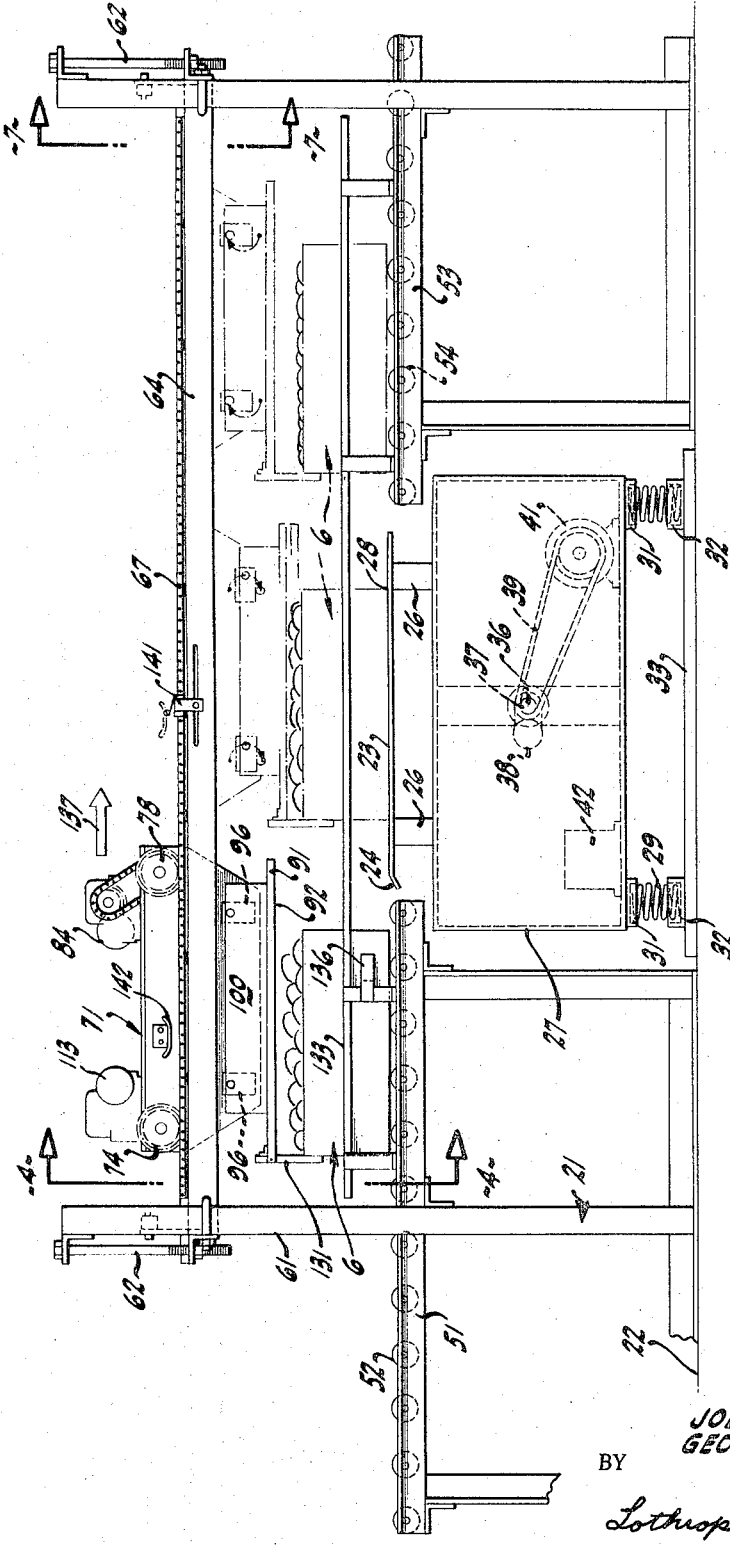

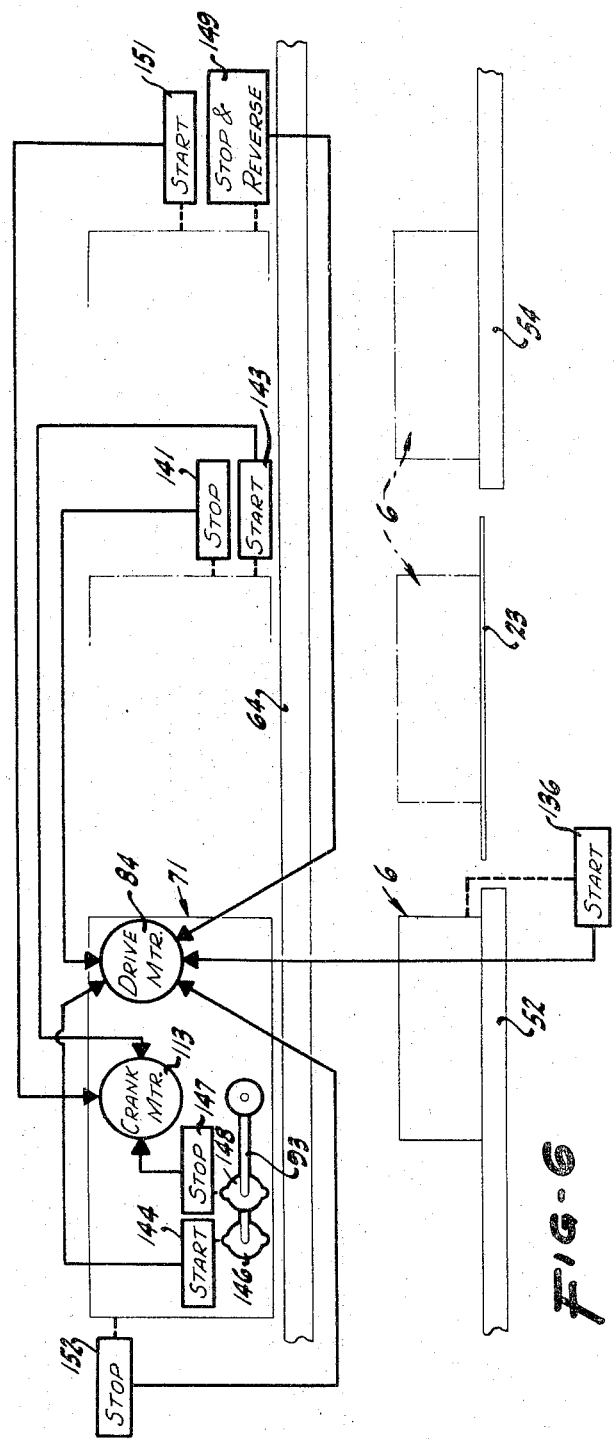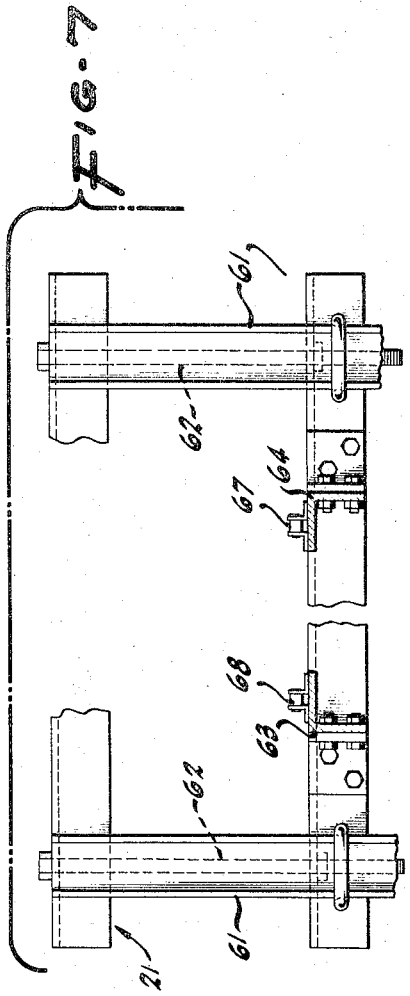

United States Patent Office 3,344,579
Patented Oct. 3, 1967

3,344,579
MACHINE FOR SETTLING FRUIT
Joe P. Gentry and George R. Giannini, Davis Calif., assignors to The Regents of The University of California, Berkeley, Calif.
Filed Feb. 6, 1964, Ser. No. 343,025
7 Claims. (Cl. 53—126)

Our invention is particularly concerned with the packing of fruit or comparable produce in a container such as a box in order to afford a tight pack. It is customary to fill or overfill a generally rectangular, open top box container with fruit or comparable produce in a random fashion and then to place a lid or cover on the box. The amount of fill may be to meet a certain weight. The lid or cover is often applied with pressure exerted on its upper surface so that the cover arches over the randomly arranged fruit and presses the fruit downwardly into the box. This has certain disadvantages in that sometimes the bulging top interferes with appropriate stacking and future handling of the box and, more particularly, because the top fruit has small-area contact with the box lid or cover and is superficially abraded or damaged and other fruit in the box may be pressure damaged also. Furthermore, subsequent shipment may so shake the box that the fruit achieves a more compact arrangement and is then loosely packed. This allows impact damage.

It is therefore an object of the invention to provide means for pre-settling fruit in a box into a compact arrangement and in such a fashion that the container lid or cover when fastened in place engages a tight pack without injury. The pack remains in tight condition during storage, handling and shipment without injury to the fruit.

Another object of the invention is to provide a machine for arranging fruit or other produce within a box so that the most compact pack results.

Another object of the invention is to provide a machine for settling fruit in a box automatically so that the lid when finally applied will not exert damaging pressure but will be effective to maintain the fruit in settled condition.

A still further object of the invention is to provide an automatic machine for settling fruit in a box and presenting the material in good condition for final closure of the box.

Other objects together with the foregoing are attained in the embodiment of the invention described in the accompanying description and illustrated in the accompanying drawings, in which:

FIGURE 1 is a side elevation of a machine for settling fruit constructed pursuant to our invention;

FIGURE 2 is a side elevation to an enlarged scale of a part of the carriage mechanism and attendant structure;

FIGURE 3 is a detail plan of a propelling structure incorporated in the carriage mechanism;

FIGURE 4 is a cross section, the plane of which is indicated by the line 4—4 of FIGURE 1;

FIGURE 5 is a detail cross section, the plane of which is indicated by the line 5—5 of FIGURE 2;

FIGURE 6 is a diagram showing the various control functions; and

FIGURE 7 is a sectional detail of a frame adjustment, the plane of section being on the line 7—7 of FIGURE 1.

While the machine of our invention has been successfully embodied primarily for use in compacting or settling fruit such as peaches and the like in rectangular containers, it is also useful in settling nectarines, pears, apricots, plums and other produce or commodities in which the environmental conditions are substantially the same.

As particularly shown in FIGURES 2 and 4, the container 6 or box for the fruit comprises a generally planar bottom wall 7, a pair of rectangular upright end walls 8 and 9, and a pair of side slats 11 and 12, leaving some openings along the sides of the box and leaving the top of the box initially open. This is a typical wood box but paperboard and composite boxes are of a similar nature. Customarily, a liner 14 conveniently of corrugated paper or the like is positioned within the box to separate the contents from the box material. The contents, for example, are objects 16 such as peaches or the like and they are normally loaded as shown in FIGURES 1 and 2 in random array and extending above the top edges of the box proper.

For settling boxed fruit of this sort we particularly provide a machine having a frame 21 constructed of the customary angles and shapes and mounted on a floor 22 or other comparable support. The frame is arranged on opposite sides of and over a vibrating table 23. This conveniently includes an upper plate downturned at its leading end 24 and carried by supports 26 on a vibrator 27. The table 23 itself is flat and affords a generally horizontal upper surface 28. Because of its vibration, the vibrator 27 is largely isolated physically from the frame 21, but is in such juxtaposition with the frame as to be functionally or operatively associated therewith. The vibrator 27 includes a hollow box resting at its four corners on a plurality of coil springs 29 received in sockets 31 and 32, the latter upstanding from a floor plate 33 resting or fastened to the floor 22.

Within the vibrator 27 is a cross shaft 36 carried in appropriate journals and designed to rotate about a cross axis 37. Eccentrically connected to the shaft 36 is a weight 38 designed to orbit about the axis 37 when the shaft is revolved. A drive belt 39 connects the shaft 36 to an electric motor 41 mounted within the container 27 toward one side thereof. In order substantially to balance the weight of the motor 41 so that an even load is imposed upon all of the springs 29 and in order to maintain the surface 28 of the table substantially horizonal, there is located within the container 27 a counterweight 42 secured in position and in effect affording an appropriate motor balance both longitudinally and transversely.

When the motor 41 is energized through flexible leads (not shown), the revolving shaft 36 girates the unbalanced weight 38 so that the entire vibrator 27 and particularly the table 23 vibrate without any restraint except that due to damping inherent in the springs 29. This vibrator mechanism is substantially of a standard sort and is referred to generally as a vibrating table. Since the weight 38 follows a circular orbit, the motion of the table 23 has components in various directions including directions which are up and down or vertical.

The frame 21 on the leading side of the vibrating table is provided with beam members 51 supporting a plurality of conveyor rollers 52 arranged substantially at the average height of the table 23 and at all times being above the lower portion of the leading lip 24. A box 6 containing fruit resting on the initial conveyor 52 on the leading side of the machine can be advanced over the rollers 52 toward the table 23 and can be transferred readily from the initial conveyor to the table. Somewhat similarly, there is a discharge conveyor comprised of beams 53 included in the frame 21 and carrying a number of conveyor rollers 54 at or slightly below the average height of the table 23, so that a box 6 can be discharged from the table onto the conveyor 54 with ease.

Pursuant to the invention, means are provided for conveying a filled box onto and away from the vibrating table and also for restricting the travel of the box while the loaded box is being vibrated. For that reason, the frame 21 includes end uprights 61 having adjusting screws 62 for supporting a pair of horizontal frame beams 63 and 64 at selected heights. These frame members overlie not only a major portion of the feeding or initial conveyor 52, but likewise overlie the vibrating table 23 and a substantial portion of the discharge conveyor 54. Fastened on the top, horizontal flanges of the members 63 and 64 are chains 66 and 67 permanently secured in parallel relationship by clips 68.

Supported on the chains for movement along the beams 63 and 64 is a carriage 71. This is inclusive of a carriage frame 72 comprised of various plates, shapes and fasteners and is of a width and height to be disposed between, extend above and depend below the side beams 63 and 64. The carriage frame at one end carries an axle 73. At its opposite ends the axle is mounted in journals and carries sprockets 74 and 76. The sprockets 74 and 76 mesh with the roller chains 66 and 67, so that the sprockets 74 and 76 rotate in unison as the carriage traverses the support beams 63 and 64. Quite similarly, the other end of the carriage is provided with a cross axle 77 carrying appropriate sprockets 78 in engagement with the chains 66 and 67, so that the axles 73 and 77 always turn together.

Propulsive force is imparted to the axle 77 by an inside sprocket 79 fixed thereon and connected by a chain 81 to a sprocket 82 on a gear reduction unit 83 situated on the top of the frame 72 and driven by a reversible motor 84. When the motor is energized, the axle 77 is revolved and the carriage is translated or propelled, the direction being dependent upon the direction of rotation of the motor 84. When the motor is deenergized, the mechanism stops short since the gear reduction mechanism 83 preferably contains a non-overhauling drive. By exercising appropriate electrical control of the motor 84, the carriage 71 can be traversed from one end to the other end of the supporting beams 63 and 64, can be stopped at any intermediate location, and can be returned for further operation to its starting point.

It is desired to advance a box 6 from one station to another on the frame, and it is desired to provide a means for limiting the motion of the fruit during vibration of the box. For these and other reasons having to do with good packing, we provide on the carriage frame 72 a platen 91. This, conveniently, is a rectangular plate of something more than the horizontal size of the box 6 and defines a nether horizontal surface 92. The platen 91 is given a substantially vertical motion relative to the rest of the carriage frame 72. That is accomplished by having a pair of cross shafts 93 and 94 mounted in journals in the depending portions of the carriage frame 72. Both cross shafts at their opposite ends carry similarly oriented cranks in two sets 96 and 97, respectively. The sets of cranks include crank pins 98 and 99 on which are journalled hangers 100 secured to the upper face of the platen 91.

The shafts 93 and 94 always turn in unison in order that the crank pins are always in the same general orientation with respect to each other. For this reason, the shafts 93 and 94 carry central sprockets 101 and 102 around which a drive chain 103 is trained. This chain likewise rides under an idler 104 mounted on the frame 72 and encompasses a drive sprocket 106 secured to a quill 107 freely journalled on the axle 73. A driven sprocket 108 fast on the quill 107 is connected by a chain 109 to a sprocket 111 on a speed reducer 112 mounted on the carriage frame 72 and driven by an electric motor 113. When the motor 113 is energized, the chains 109 and 103 are operated. Consequently, the quill 107 turns freely on the axle 73 and rotates the shafts 93 and 94 correspondingly. Since the speed reducer 112 is preferably of the non-overhauling type, when the motor 113 is deenergized the mechanism stops abruptly. The motor is preferably reversible and operates in either direction. When the motor 113 is energized, all of the cranks 96 and 97 are rotated in the same direction and in the same phase, affording a parallel link drive motion to the platen 91. The platen thus moves with respect to the carriage frame 72 in a circular path having horizontal and vertical components. That is to say, the platen 91 has motion components toward and away from the box 6, especially when the box is in position on the vibrator 27.

To afford some adjustment of the parts and to afford good meshing of the sprockets 74 and 76 with the chains 66 and 67, the carriage frame 72 does not have its weight transmitted through the various sprockets 74 and 76 to the chains 66 and 67. Rather, the carriage frame is provided at four points with pairs of supporting and confining rollers 116 and 117, respectively. These are secured by adjusting nuts 118 and 119 in vertically elongated slots 121 so that the rollers 116 and 117 can be variably spaced in a vertical direction to lift or lower the carriage frame 72 with respect to the rails 63 and 64. The rollers 116 rest upon bars 122 running along one edge of the beams 63 and 64 alongside the chains 66 and 67, whereas the retainer rollers 117 operate at a slight distance below the horizontal flange of the frame beams.

The carriage frame 72 is provided with means for engaging and advancing a box of fruit on the conveyor structure. As especially shown in FIGURE 3, the platen 91 along its trailing edge has a notch 126 overlain by an angle 127 and extended by a pair of ears 128. A pivot pin 129 piercing the ears serves as a support for a propulsion bar 131. In its upright position, the propulsion bar extends upwardly above the pivot pin 129 to abut the upstanding flange of the angle 127. Clockwise rotation (in FIGURE 2) of the bar 131 is precluded, although counterclockwise rotation (in FIGURE 2) is free for nearly ninety degrees of motion. The length of the bar 131 is sufficient so that in one direction of carriage motion and in any vertical position of the platen 91, the bar has firm engagement with the trailing end 8 of the box 6.

In the operation of this structure, a randomly filled box on the conveyor 52 is advanced by hand or by any other suitable means along that conveyor toward or in the direction of the vibrating table 23. The advancing box rides between and is confined by a pair of side guide rails 133 and 134. The box follows a straight path between the guide rails supported on the conveyor rollers 52. The box is thus advanced to a station beneath the carriage 71 when the carriage is in its initial position toward the left in FIGURE 1. The depending bar 131 simply swings upwardly and then falls back by gravity behind the box as the box 6 is positioned approximately beneath the carriage 71.

When it is brought into its initial station, the box front engages and operates an electric switch 136 (FIGURES 1 and 6) which closes a circuit to energize the drive motor 84. Energized, the motor 84 operates the sprockets 79 in engagement with the chains 66 and 67 and thus advances the carriage 71 in the direction of the arrow 137 in FIGURE 1. The carriage advances with the bar 131 abutting the rear wall 8 of the filled, open top box and so advances the box between the guide rails 133 and 134 from the conveyor rollers 52 onto the upper surface of the table 23 of the vibrating mechanism. The motor 41 operates continually during the operation of the machine so that the table 23 is always active. The open top box of fruit also vibrates while it is on the table and this vibration causes rearrangement and settlement or compaction of the fruit.

The settling operation usually requires something more than simple traverse time. Hence, when the box 6 is positioned on the table 23, the advance of the carriage 71 is interrupted temporarily and the carriage and box remain stationary in the vibrating station. This action is accomplished by a frame mounted switch 141 actuated by a carriage shoe 142. The switch 141 is opened at this station to turn off the motor 84.

Since vibration alone will not afford maximum compaction of the fruit within the box, we provide that the platen 91 be gradually lowered during the vibration of the fruit so that the vertical excursions of the fruit, particularly in an upward direction out of the box, are confined more and more and the fruit is restricted to a shorter and shorter vertical path until finally substantially no vertical motion of the fruit relative to the box is permitted. In effect, this amounts to putting a temporary cover on the box in a gradual fashion and with varying degrees of motion restriction or pressure on the fruit and with a predetermined approach to the top edges of the box ends 8 and 9. The platen motion is started by appropriate energization of the crank motor 113. The shoe 142 operates a frame mounted switch 143 (FIGURE 4) to give power to the motor 113.

When the motor 113 is energized, the cranks revolve and gradually lower the platen 91. The surface 92 approaches closer and closer to the table surface 28. As the fruit achieves new positions because of the continuing vibration, the fruit is confined more and more and is prevented from leaving the closely compacted positions. This action can also be considered as exerting pressure upon the fruit by the platen, but in no instance is this pressure sufficient to injure or damage the fruit. Particularly in the case of non-wooden boxes, a soft cover may initially overlie the fruit so that the platen does not come into direct contact with the fruit, but confines the fruit through the cover.

After the motor 113 has been energized for long enough to drive the cranks through substantially a half rotation to bring the platen 91 into its position of closest approach to the table 23, a switch 144 actuated by one of two opposite lobes on a cam 146 on the shaft 93 restarts the drive motor 84. At the same time, a switch 147 actuated by one of two opposite lobes on a cam 148 also on the shaft 93 stops the crank motor 113 to hold the platen 91 in the vicinity of the box. Since the fruit has been by now compacted to its maximum extent, the drive motor 84, having been reenergized, advances the carriage 71 and the bar 131 forces the compacted box off of the vibrating table onto the discharge conveyor 54. During this time, the motor 113 has been de-energized so that the platen stays down as the box advances. The box then discharges from the machine by any suitable means, not shown. If no lid has been initially positioned, one is now put on and fastened. If a lid has been loosely positioned initially, it is now fastened.

When the carriage 71 has substantially completed discharge of the box, it engages a switch 149 on the frame 21 (FIGURES 1 and 6). This stops the drive motor 84 and reverses it but does not re-energize it. The carriage at the end of its travel also engages a switch 151 which energizes the crank motor 113. The platen is thus raised while the carriage remains temporarily in its extreme discharge position. When the shaft 93 has revolved through one-half a revolution and the cranks are again in uppermost position with the platen fully raised, the other lobe on the cam 148 stops the crank motor 113 and the other lobe on the cam 146 starts the previously reversed driving motor 84. The carriage 71 is thus returned to its starting position, the intermediate stop switch 141 being ineffective upon the return travel since it is unidirectionally actuated. Similarly, the platen is not actuated during the return stroke but remains raised since the switch 143 is also unidirectionally actuated. The bar 131 yields to any boxes awaiting treatment. Approaching its initial station, the carriage 71 actuates a stop switch 152 which stops the drive motor 84 and makes it again available for forward rotation when the switch 136 is again closed.

What is claimed is:

1. A machine for settling fruit in a box comprising a frame, a pair of horizontal box supports on said frame in spaced relationship to leave an intervening gap, a vibrator table disposed in said gap and substantially continuing said box supports, a carriage, means for mounting said carriage on said frame for horizontal movement, means for propelling said carriage in opposite directions between stations on opposite ends of said vibrator table, means on said carriage for engaging and propelling a box on one of said supports onto said vibrator table and then onto the other of said supports, means on said carriage adapted to engage fruit in said box, and means on said carriage for moving said fruit engaging means toward fruit in said box while said carriage is adjacent said vibrator table.

2. A machine for settling fruit in a box comprising a frame, a pair of horizontal box supports on said frame in spaced relationship to leave an intervening gap, a vibrator table disposed in said gap and substantially continuing said box supports, a carriage, means for mounting said carriage on said frame for reciprocating movement over said box supports and over said vibrator table, means on said carriage for engaging a box on one of said supports and moving said box with said carriage, and means on said carriage for movement toward the top of said box while said box is on said vibrator table.

3. A machine for settling fruit in an open topped box wherein some of said fruit projects upwardly above said open top comprising a stationary frame, a horizontal vibrator table adjacent said frame, means for continuously vibrating said vibrator table in a vertical direction only, means for positioning said box containing fruit on said vibrator table whereby said box and said fruit are concurrently vibrated in said vertical direction, means on said frame including a horizontal platen for overlying fruit in said box, and means on said frame for moving and holding said platen vertically downward into contact with said vibrated fruit but out of contact with said box while said box is vibrated on said vibrator table.

4. A machine for settling fruit in a box comprising a stationary frame, a vibrator table adjacent said frame, means for positioning an open top box on said vibrator table, a horizontal platen, and means on said frame for supporting the platen thereon and for moving said platen in a vertical direction toward said open top of said box and for stopping and holding said platen stationary short of said open top of said box and in contact with the fruit thereon while said box is on said vibrator table.

5. A machine for settling fruit in a box comprising a frame, a vibrator table cooperatively associated with said frame, a first box support on said frame leading to one side of said vibrator table, a second box support on said frame leading from the other side of said vibrator table, means on said frame extending over said first and second box supports and over said vibrator table for supporting a carriage for horizontal movement, a carriage on said supporting means, means for reciprocating said carriage on said supporting means, a platen, means for mounting said platen on said carriage for movement substantially toward and away from said vibrator table, and means for moving said platen toward said vibrator table when said carriage is substantially over said vibrator table.

6. A machine for settling fruit comprising a frame, a vibrator table cooperatively associated with said frame, box supporting means leading to and from said vibrator table, a carriage, means for supporting said carriage on said frame for movement over said box supporting means and said vibrator table, a platen, crank arms on said carriage for supporting said platen thereon for movement toward and away from said vibrator table, means on said carriage for rotating said crank arms, means on said carriage for reciprocating said carriage on said frame, means on said carriage for propelling a box on said supporting means, and means for operating said rotating means and said reciprocating means in timed relationship.

7. A machine for settling fruit comprising a vibrating table having a horizontal upper surface, a frame, a horizontal track on said frame overlying said upper surface, a platen having a horizontal nether surface, a carriage including a crank mechanism for supporting said platen on said frame for movement of said nether surface toward and away from said upper surface, means on said carriage for moving a box onto and off of said vibrating table beneath said platen, and means for operating said carriage and said crank mechanism in timed relationship.

References Cited

UNITED STATES PATENTS

| | | | |
|---|---|---|---|
| 2,877,704 | 3/1959 | Morris | 53—126 X |
| 3,099,115 | 7/1963 | McKibben et al. | 53—126 X |
| 3,153,834 | 10/1964 | Boyer et al. | 53—126 X |

GRANVILLE Y. CUSTER, Jr., *Primary Examiner.*

TRAVIS S. McGEHEE, *Examiner.*

R. L. FARRIS, *Assistant Examiner.*